(12) United States Patent
Rajagopalan et al.

(10) Patent No.: US 11,650,743 B2
(45) Date of Patent: May 16, 2023

(54) UPDATING STORAGE DRIVE FIRMWARE

(71) Applicant: Dell Products L.P., Round Rock, TX (US)

(72) Inventors: Vivekanandh Narayanasamy Rajagopalan, Bangalore (IN); Swee Chay Hia, Singapore (SG); Srikanth Kondapi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 16/780,197

(22) Filed: Feb. 3, 2020

(65) Prior Publication Data

US 2021/0240371 A1    Aug. 5, 2021

(51) Int. Cl.
*G06F 9/445* (2018.01)
*G06F 3/06* (2006.01)
*G06F 8/65* (2018.01)

(52) U.S. Cl.
CPC .......... *G06F 3/0632* (2013.01); *G06F 3/0604* (2013.01); *G06F 3/0653* (2013.01); *G06F 3/0673* (2013.01); *G06F 8/65* (2013.01)

(58) Field of Classification Search
CPC .... G06F 3/0632; G06F 3/0604; G06F 3/0653; G06F 3/0673; G06F 8/65
USPC .................................................. 717/168–178
See application file for complete search history.

(56) References Cited

U.S. PATENT DOCUMENTS

| | | | |
|---|---|---|---|
| 2006/0248107 A1* | 11/2006 | Coronado | G06F 8/60 |
| 2014/0189673 A1* | 7/2014 | Stenfort | G06F 9/445 |
| | | | 717/170 |
| 2020/0334122 A1* | 10/2020 | Shepard | G06F 11/3089 |

* cited by examiner

*Primary Examiner* — Chuck O Kendall
(74) *Attorney, Agent, or Firm* — Kirton McConkie; Brian Tucker

(57) ABSTRACT

Storage drives can be configured to provide a component ID. An update tool on an end user device can be configured to retrieve this component ID in response to receiving a catalog that defines available firmware updates and to use the retrieved component ID to dynamically identify which firmware update applies to a particular storage drive. The firmware update can then be installed on the storage drive. The update tool may also perform a health assessment to dynamically determine whether the storage drive's health is sufficient to proceed with a firmware update.

12 Claims, 13 Drawing Sheets

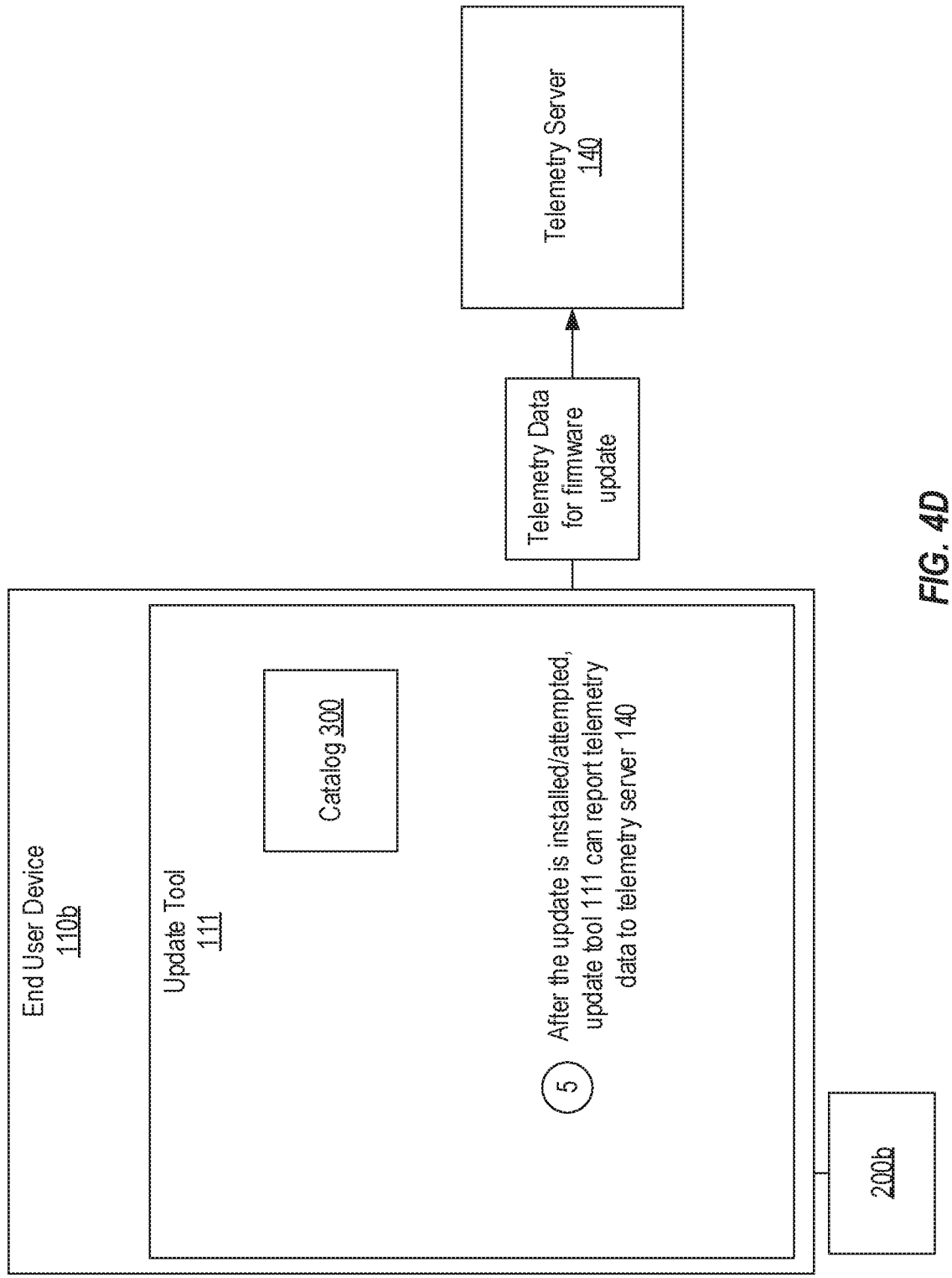

UPDATING STORAGE DRIVE FIRMWARE

CROSS-REFERENCE TO RELATED APPLICATIONS

N/A

BACKGROUND

A wide variety of storage drives, including both hard disk drives (HDDs) and solid state drives (SSDs), are commonly included on end user computing devices. For example, original equipment manufacturers (OEMs) such as Dell and HP may support storage drives provided by many different vendors such as Seagate, Toshiba, Samsung, Western Digital, Intel, Micron, etc. Although these vendors strive to release issue-free storage drives, there will inevitably be data integrity, blue screen of death or other issues that require a firmware update to resolve. Additionally, a firmware update may be necessary to provide revised or new functionality.

Unlike updates to applications or drivers which are typically distributed and installed in a standard manner (e.g., via a single update tool such as Dell Update, HP Support Assist or Windows Update), storage drive firmware updates are vendor-specific and typically involve a complex set of instructions. This is primarily because the firmware is installed on the unique architectures of the various vendors' storage drives as opposed to being installed in the host environment running a common operating system (e.g., Windows). Therefore, in practice, it typically requires an administrator (or at least someone with a strong computer background) to install a firmware update on a storage drive. As a result, many storage drives are never updated by the customer/end user. Instead, the customer may oftentimes return a storage drive or may make a service call to the OEM when a firmware update is all that is needed.

Additionally, even when the customer/end user attempts to install a firmware update on a storage drive, if the installation process is not performed properly, the storage drive may become inaccessible or "bricked." Recovering data from a bricked storage drive can be very costly, if it is even possible. In short, the difficulties of obtaining and installing firmware updates on storage drives create significant costs for the OEM, both in time and money, and degrade the customer experience.

BRIEF SUMMARY

The present invention extends to methods, systems, and computer program products for updating storage drive firmware. Storage drives can be configured to provide a component ID. An update tool on an end user device can be configured to retrieve this component ID in response to receiving a catalog that defines available firmware updates and to use the retrieved component ID to dynamically identify which firmware update applies to a particular storage drive. The update tool may also perform a health assessment to dynamically determine whether the storage drive's health is sufficient to proceed with a firmware update.

In some embodiments, the present invention is implemented by an update tool that executes on an end user device as a method for updating firmware on a storage drive. The update tool retrieves the component ID from the storage drive. The update tool then uses the component ID to identify a firmware update that applies to the storage drive. The update tool can then install the firmware update on the storage drive.

In some embodiments, the present invention is implemented as computer storage media storing computer-executable instructions which when executed implement a method for updating firmware on a storage drive. In this method, an update tool that executes on an end user device receives a catalog that identifies updates that target the end user device. In response to receiving the catalog, the update tool retrieves a component ID from a storage drive of the end user device and uses the component ID to locate a firmware update that is identified in the catalog. The update tool can then install the firmware update on the storage drive.

In some embodiments, the present invention is implemented as an end user device that includes a storage drive, one or more processors and computer readable media storing computer executable instructions which when executed implement an update tool. The update tool can update firmware on the storage drive by retrieving a component ID from the storage drive and using the component ID to identify a firmware update that is applicable to the storage drive. The update tool can then install the identified firmware update on the storage drive.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A-4D provide an example of how an update tool on an end user device can perform a health assessment to dynamically determine whether a storage drive's health is sufficient to proceed with a firmware update.

DETAILED DESCRIPTION

In the specification and the claims, the term "storage drive" should be construed as encompassing both hard disk drives and solid state drives. The term "firmware" should be given its ordinary meaning such as software that is programmed into hardware. Accordingly, storage drive firmware should be construed as the software that exists on a storage drive. The term "package" should be construed as a collection of one or more files that are delivered when firmware is updated. For example, in a Windows environment, a package (or "firmware package") may include the payload for a firmware update that can be distributed to the hardware via the Unified Extensible Firmware Interface ("UEFI"). In some embodiments, a package may be in the form of an .exe file. The term "catalog" should be construed as metadata that defines one or more collections of packages that are intended for one or more groupings of end user devices (i.e., "target system(s)"). For example, a catalog may be in the form of an .xml file that identifies characteristics of the targeted end user devices and lists all of the packages that are intended for the targeted end user devices.

Figure 1:
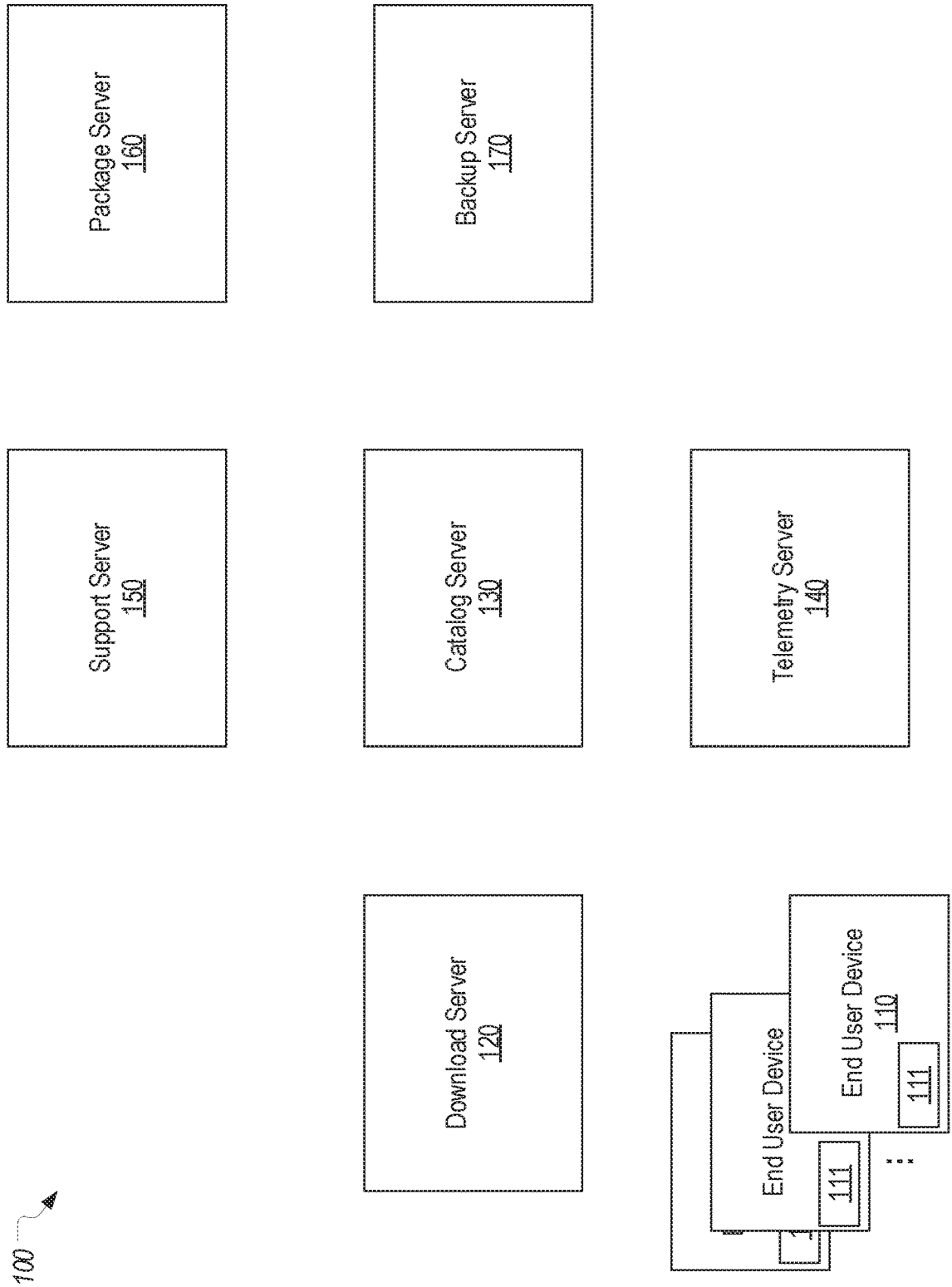
FIG. 1 illustrates an example computing environment in which the present invention can be implemented.

FIG. 1 illustrates an example computing environment 100 in which the present invention may be implemented. Computing environment 100 includes a number of end user devices 110, a download server 120, a catalog server 130, a telemetry server 140, a support server 150, a package server 160 and a backup server 170. In this context, the term "server" should be construed as representing any suitable arrangement of hardware and/or software components that would enable the functionality described herein to be accomplished. The depiction of each server being separate is for illustrative purposes only. For example, in some embodiments, some or all of the depicted servers could be implemented within the same cloud architecture, whereas, in other embodiments, each depicted server could be implemented on a separate computing device. In short, the present invention should not be limited to any particular architecture but should encompass the described functionality that can be implemented in a wide variety of architectures.

End user devices 110 may typically represent desktops, laptops or other personal computing devices to which packages can be deployed to install/update drivers and/or firmware. In a common example, end user devices 110 could represent a group or all of a particular OEM's (e.g., Dell's or HP's) end user devices. As shown, an update tool 111 can be installed on end user devices 110. Update tool 111 can be configured to retrieve and install packages on end user device 110 as well as other functionality as described below.

Download server 120 can represent the components in computing environment 100 that enable update tool 111 to download (or otherwise retrieve) packages for installation on end user devices 110. As an example only, download server 120 could encompass the components that implement the downloads.dell.com website and corresponding back-end services. Catalog server 130 can represent the components in computing environment 100 that create and maintain catalogs.

Telemetry server 140 can represent the components in computing environment 100 that receive telemetry data from update tool 111. Support server 150 can represent the components in computing environment 100 that implement end-user support services. As an example only, support server 150 could encompass the support.dell.com website and corresponding back-end services. Package server 160 can represent the components in computing environment 100 that store packages received from providers. For example, storage drive providers may deliver firmware packages to package server 160 so that the firmware packages can be distributed to end user devices 110 via download server 120. Backup server 170 can represent the components in computing environment that enable content of a storage drive to be backed up.

Figure 2:
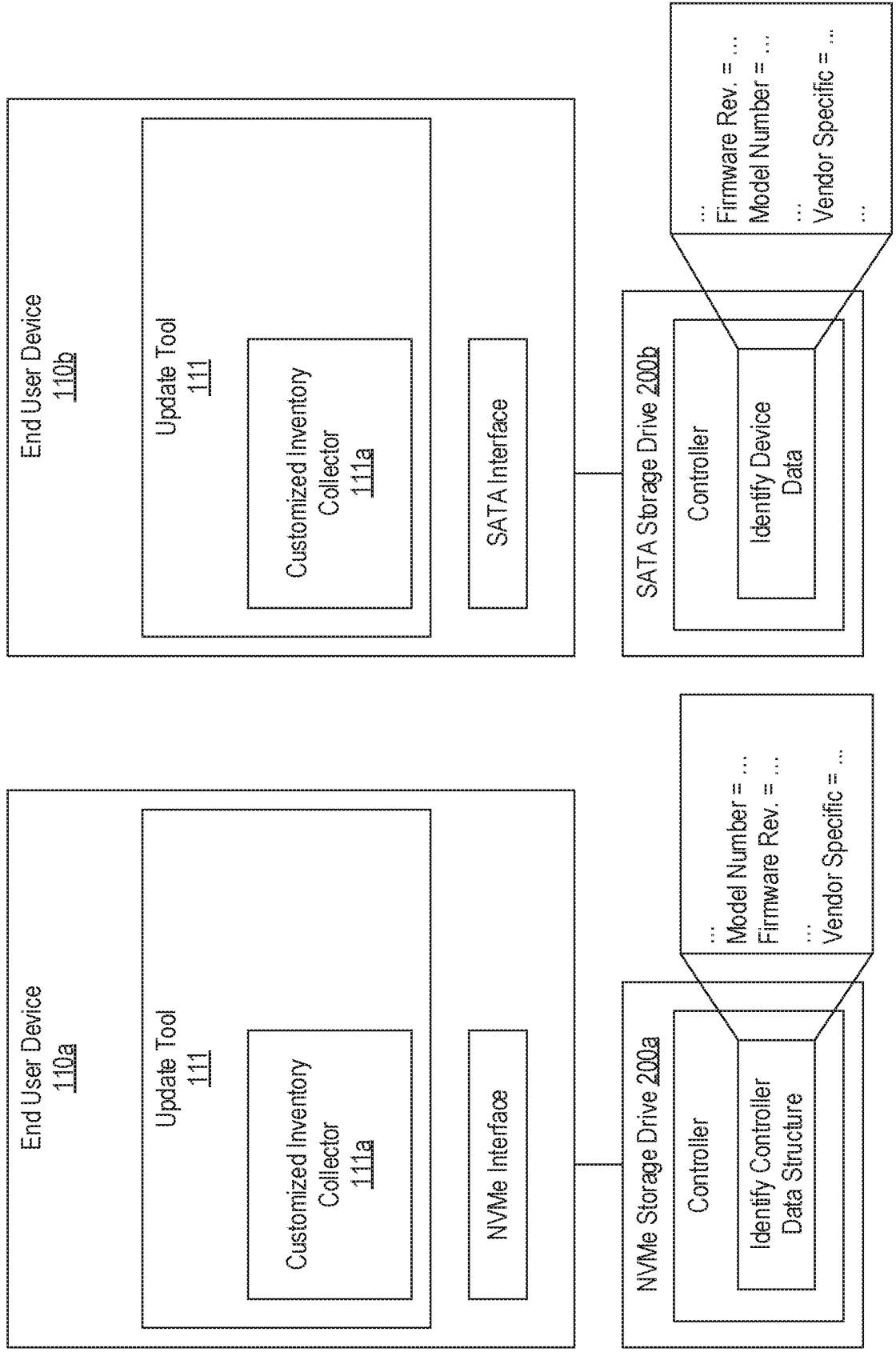
FIG. 2 illustrates an example of how end user devices having storage drives can be configured to enable embodiments of the present invention to be implemented.

FIG. 2 illustrates that update tool 111 can include a customized inventory collector 111a. Customized inventory collector 111a can be configured to employ an appropriate interface to communicate with a storage drive. For example, end user device 110a includes a storage drive 200a that employs the Non-Volatile Memory Express (NVMe) interface while end user device 110b includes a storage drive 200b that employs the Serial Advanced Technology Attachment (SATA) interface. Accordingly, end user devices 110a and 110b will include the appropriate components (e.g., drivers) for communicating over the NVMe and SATA interfaces respectively (illustrated as an NVME interface and a SATA interface respectively). It is noted that the present invention should not be limited to embodiments where the storage drives are NVMe or SATA storage drives but could be implemented in embodiments where storage drives employ some other interface for communicating with the host system.

FIG. 2 also shows that the controller on storage drive 200a maintains an "identify controller data structure" in accordance with the NVMe specification. The identify controller data structure defines characteristics, capabilities and features of the storage drive including a model number of the storage drive (bytes 24 through 63) and a firmware revision of the firmware that is currently installed on the storage drive (bytes 64 through 71). The identify controller data structure may also define vendor-specific content (bytes 3072 through 4095). Similarly, storage drive 200b maintains "identify device data" in accordance with the SATA specification which also defines characteristics, capabilities and features of the storage drive including a firmware revision (words 23 through 26) and a model number (words 27 through 46). The identify device data may also include vendor-specific content (words 129 through 159). In the remainder of the specification and the claims, the term "identify data" will be used as a general term and should be construed as encompassing the content of the NVMe identify controller data structure, the SATA identify device data or the equivalent content/data of any other standardized interface that may be used for communicating with storage drives.

Customized inventory collector 111a can be configured to read at least a portion of the identify data. For example, in a Windows-based implementation, customized inventory collector 111a could be configured to retrieve the identify data from a storage drive by sending the IOCTL_STORAGE_QUERY_PROPERTY control code, by reading the IDENTIFY_DEVICE_DATA structure or any other suitable technique that the Windows operating system may provide. Similarly, in a Linux-based implementation, customized inventory collector 111a could be configured to retrieve the identify data from a storage drive using the nvme-id-ctrl or sg_sat_identify command.

In accordance with embodiments of the present invention, each storage drive may be configured so that its identify data includes a component ID. As will become apparent below, this component ID functions as an identifier for the purpose of linking a firmware update to the particular storage drives to which the firmware update pertains. This component ID can be stored at a defined location within the vendor-specific content of the identify data. Accordingly, to retrieve the component ID of a particular storage drive, customized inventory collector 111a can query for the identify data and then extract the component ID by reading the values at a particular offset within the retrieved identify data (e.g., bytes 3126 through 3133 in the NVMe identify controller data structure or words 137 through 140 in the SATA identify data data).

FIGS. 3A-3G illustrate an example of how customized inventory collector 111a can dynamically identify a storage drive and, based on the identification, automatically select and then install the appropriate storage drive firmware update. Notably, the dynamic identification of the storage drive as well as the automatic selection of the appropriate storage drive firmware update enables the firmware update to be deployed and installed in a manner that is familiar to the customer/end user even though the installation involves a process that is specific to the architecture of the particular vendor's storage drive.

Figure 3A:
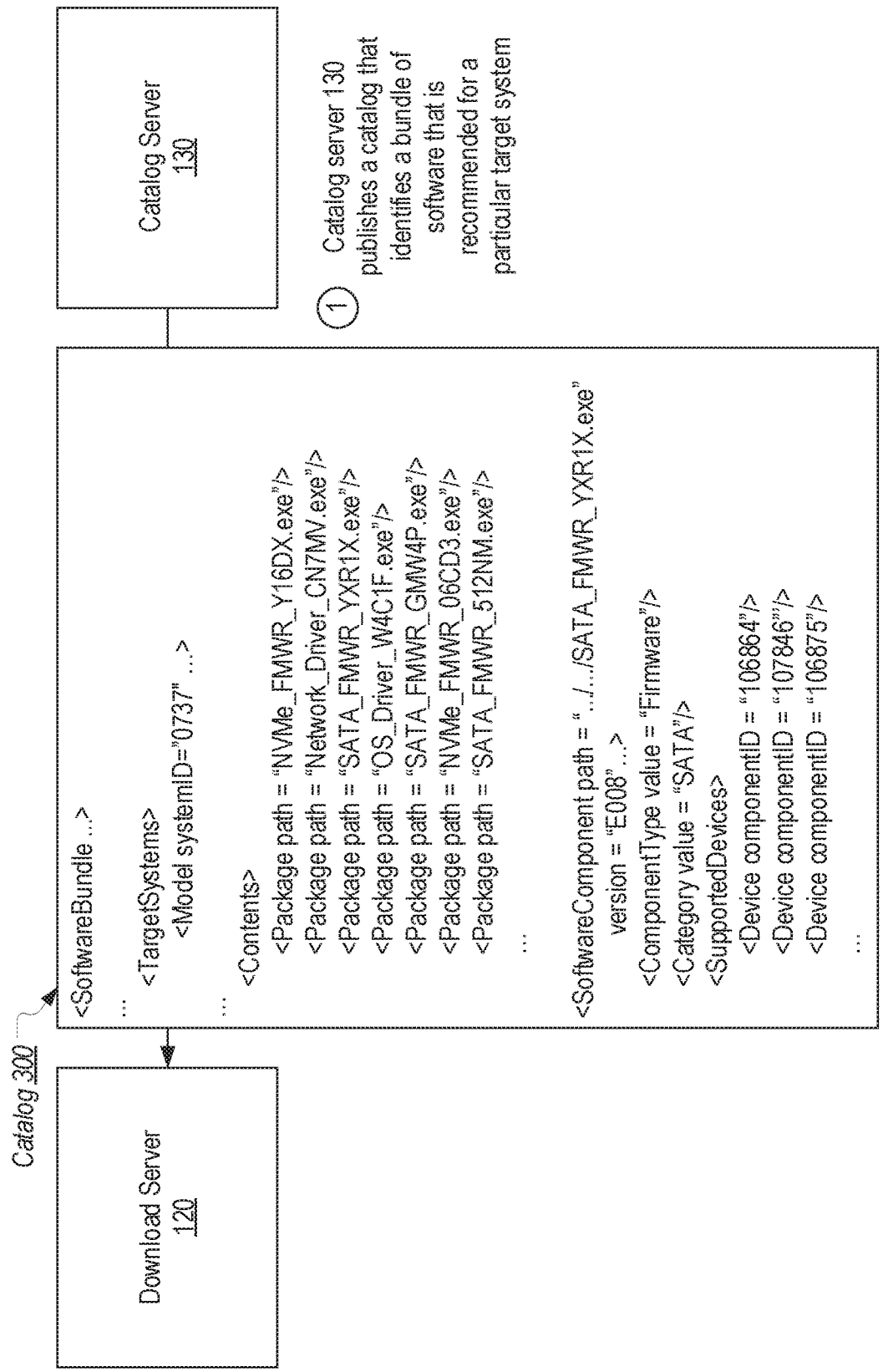
FIGS. 3A-3G provide an example of how an update tool on an end user device can dynamically identify a storage drive for the purpose of determining which firmware update applies to the storage drive.

FIG. 3A illustrates that, in step 1, catalog server 130 publishes a catalog 300 that defines one or more "software bundle" sections each of which pertains to one or more particular "target systems." In this example, catalog 300 is shown as defining a software bundle for target systems having a model number (or systemID) of 0737. Catalog 300, which is a simplified example of the type of information a catalog may typically contain in practice, may specify other characteristics of the targeted system(s) such as the type of operating system.

Catalog 300 also defines a "contents" section for the software bundle which lists the packages that are included in the software bundle. These packages may typically include driver packages and firmware packages pertaining to drivers and firmware that may be installed on the targeted systems. For example, catalog 300 lists two firmware packages pertaining to firmware for NVMe storage drives, three firmware packages pertaining to SATA storage drives and two driver packages, among possibly many other packages. Notably, in a typical scenario, not all of the packages listed in a catalog will be applicable to each end user device that the catalog targets. For example, an end user device 100 may only include a single storage drive and therefore only one of the storage drive firmware packages defined in catalog 300 may apply to the end user device.

For each package that it identifies, catalog 300 may also include a "software component" element that provides details for the package. For example, catalog 300 is shown as including a software component element for the package named "SATA_FMWR_YXR1X.exe" which indicates that the package is "Firmware" for "SATA" storage drives. The software component element may also identify the component ID of each type of device (i.e., each type of SATA storage drive) to which the package applies. In this example, it is assumed that the package which is in the form of an executable named "SATA_FMWR_YXR1X.exe" is a firmware package for any SATA storage drive that may have the component ID 106864, 107846 or 106875. Although not shown, this software component element could also identify each of the systems that the package targets. It can be assumed that the vendor of these SATA storage drives had previously provided this firmware package (or at least the contents for this firmware package) to package server 160 along with sufficient information to enable catalog server 130 to compile the information defined in catalog 300 for this package.

Figure 3B:
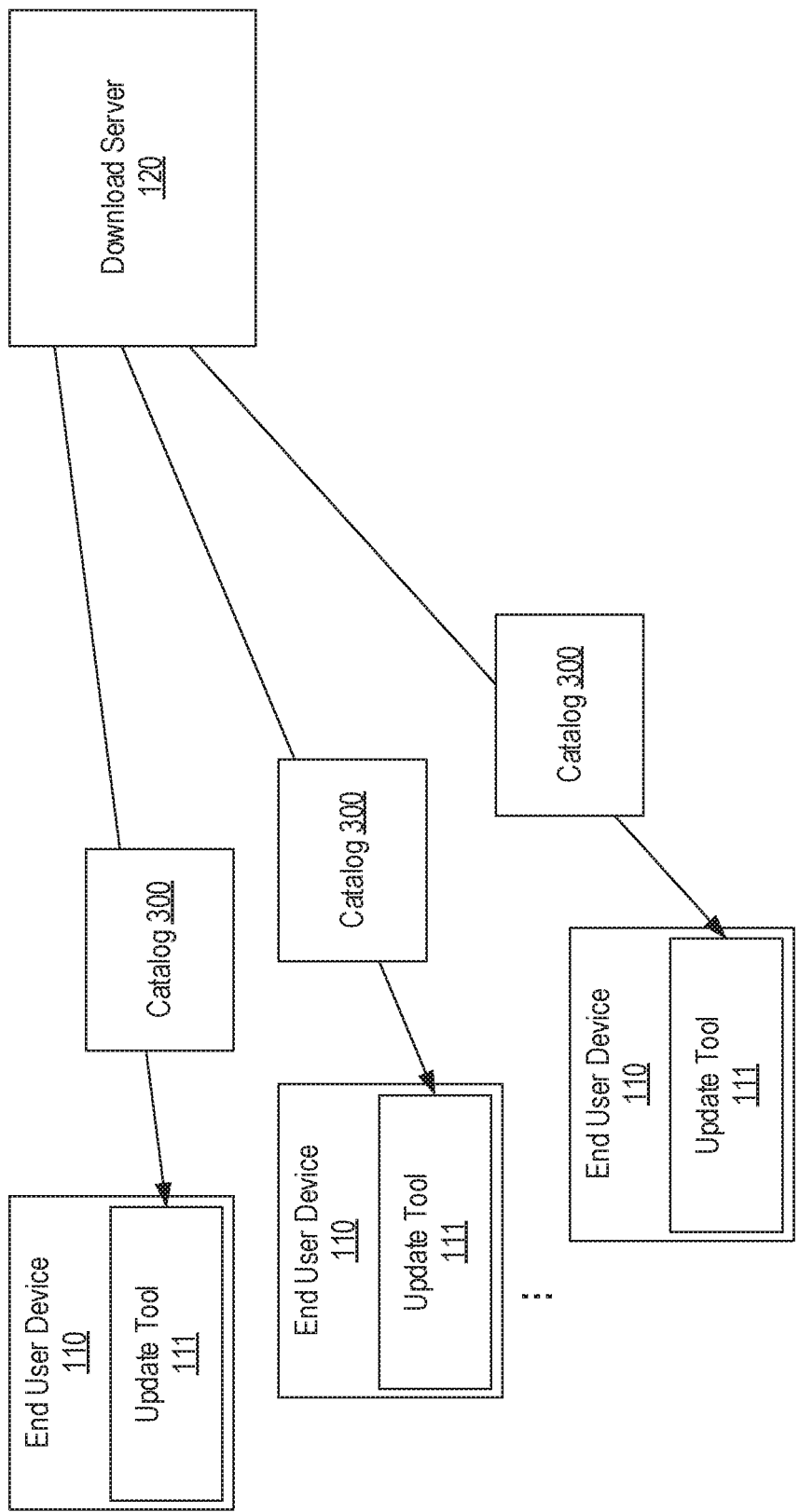

Turning to FIG. 3B, once catalog 300 has been published and is therefore available on download server 120, in step 2, update tool 111 on each end user device 110 can interface with download server 120 to retrieve catalog 300. For example, update tool 111 can be configured to periodically query download server 120 to retrieve applicable catalogs (or other update information). In this example, update tool 111 could be configured to query download server 120 for any catalog that targets a system matching the system of the end user device 110 on which it is executing.

Figure 3C:
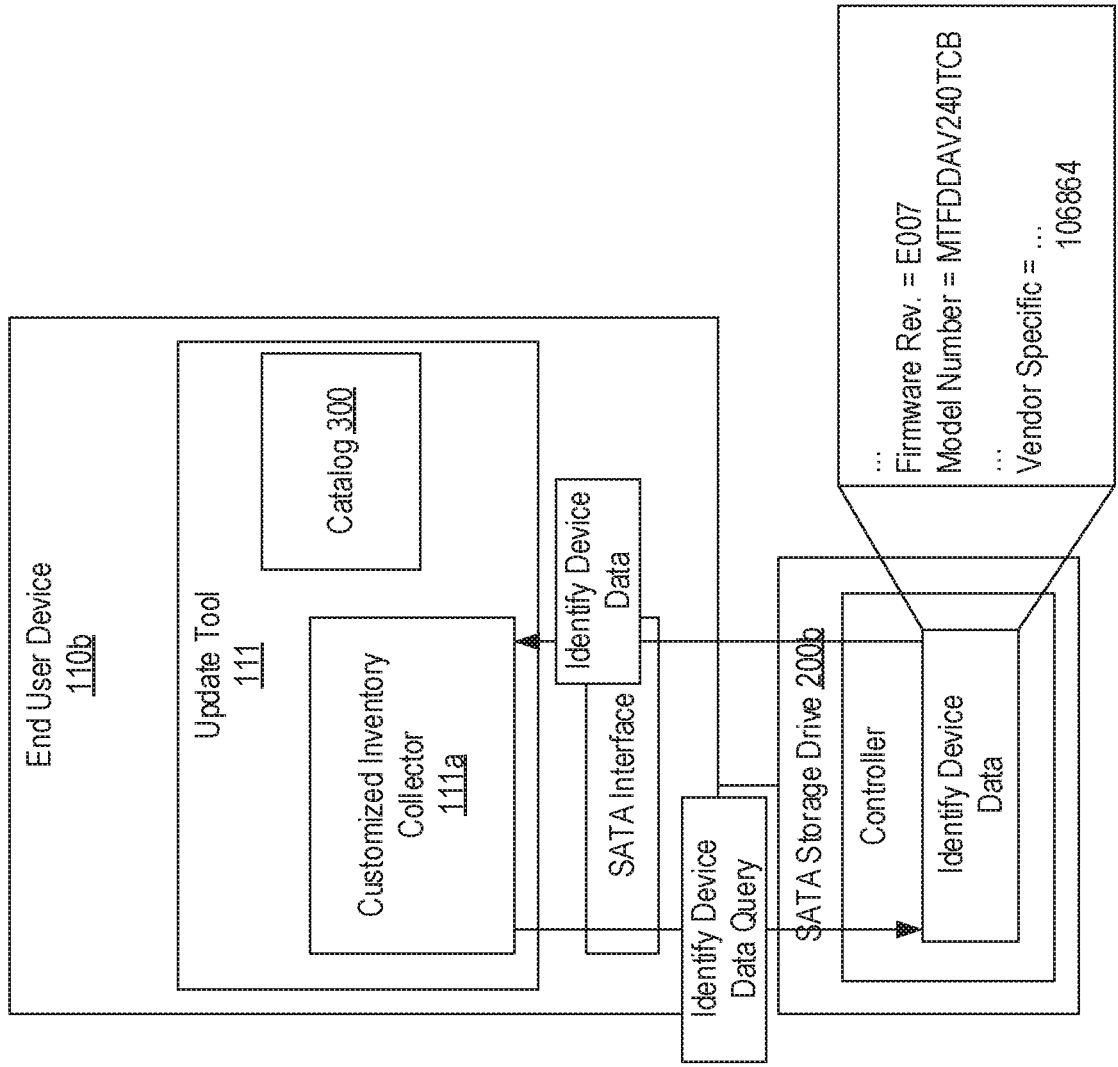

FIG. 3C represents an example of how update tool 111 that is executing on end user device 110*b* can process catalog 300. In step 3, update tool 111 can employ customized inventory collector 111*a* to retrieve the identify data (which is the SATA identify device data in this example) from storage drive 200*b*. For example, customized inventory collector 111*a* could issue an I/O control to the device stack for storage drive 200*b* requesting that the entirety of the SATA identify device data be read. As another example, if the SATA identify device data had already been read and stored in data structures on end user device 110*b*, customized inventory collector 111*a* could read such data structures (or at least the applicable portions of such data structures). In any case, as part of this step, customized inventory collector 111*a* can identify the firmware revision and the component ID defined within the identify data. As presented in FIG. 3C, it is assumed that the identify device data of SATA storage drive 200*b* currently defines the firmware revision as E007 and includes a component ID of 106864 in the vendor-specific section.

Although not shown in the figures, in some embodiments, custom inventory collector 111*a* can convert the identify data into a normalized format for use in comparison with catalog 300. For example, customized inventory collector 111*a* could output an XML file that lists the component ID, firmware revision, and possibly other portions of the identify data. In some embodiments, customized inventory collector 111*a* may also normalize the format of the firmware revision to facilitate comparison with a firmware revision defined in catalog 300.

Figure 3D:
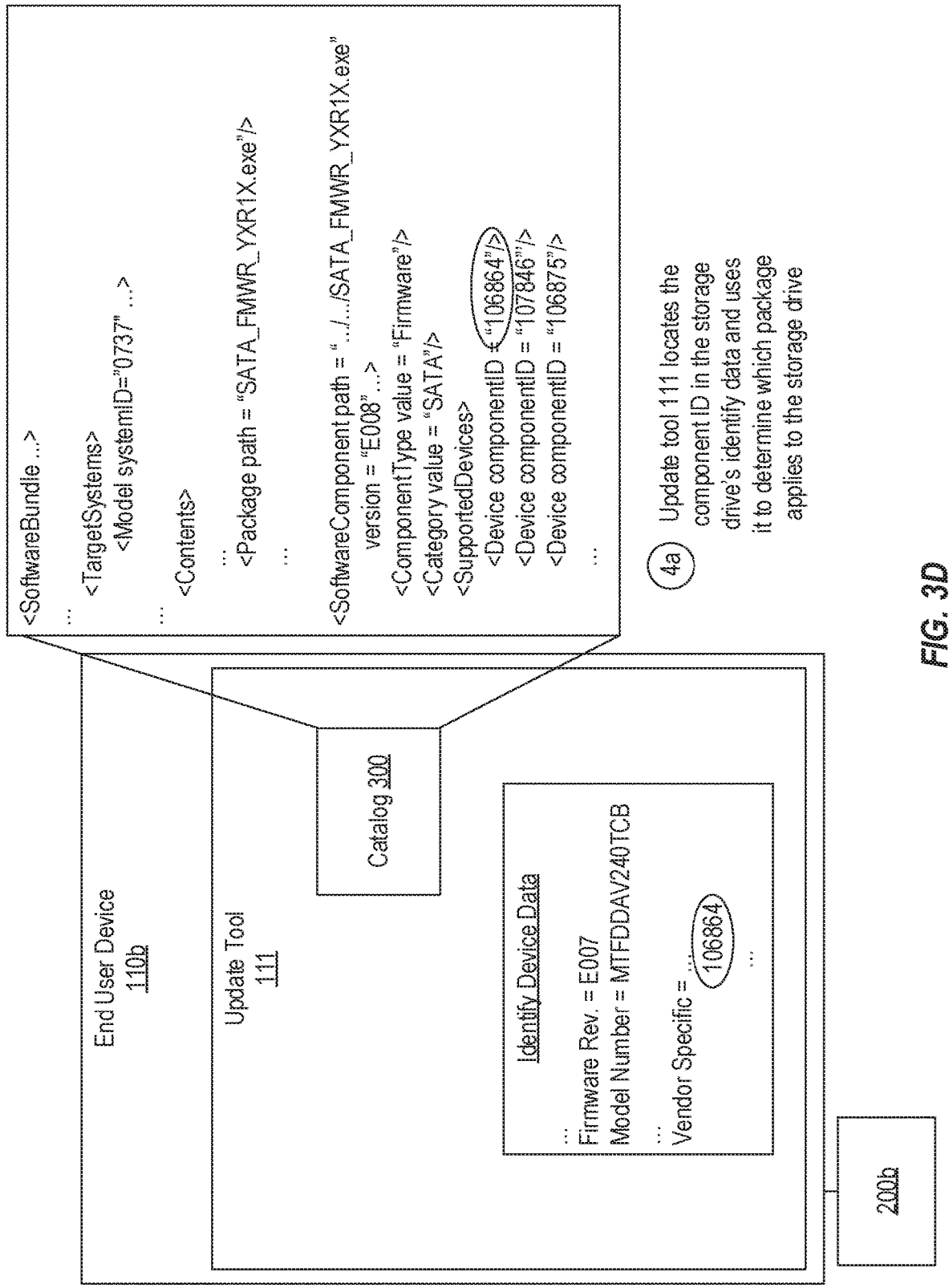
Figure 3E:
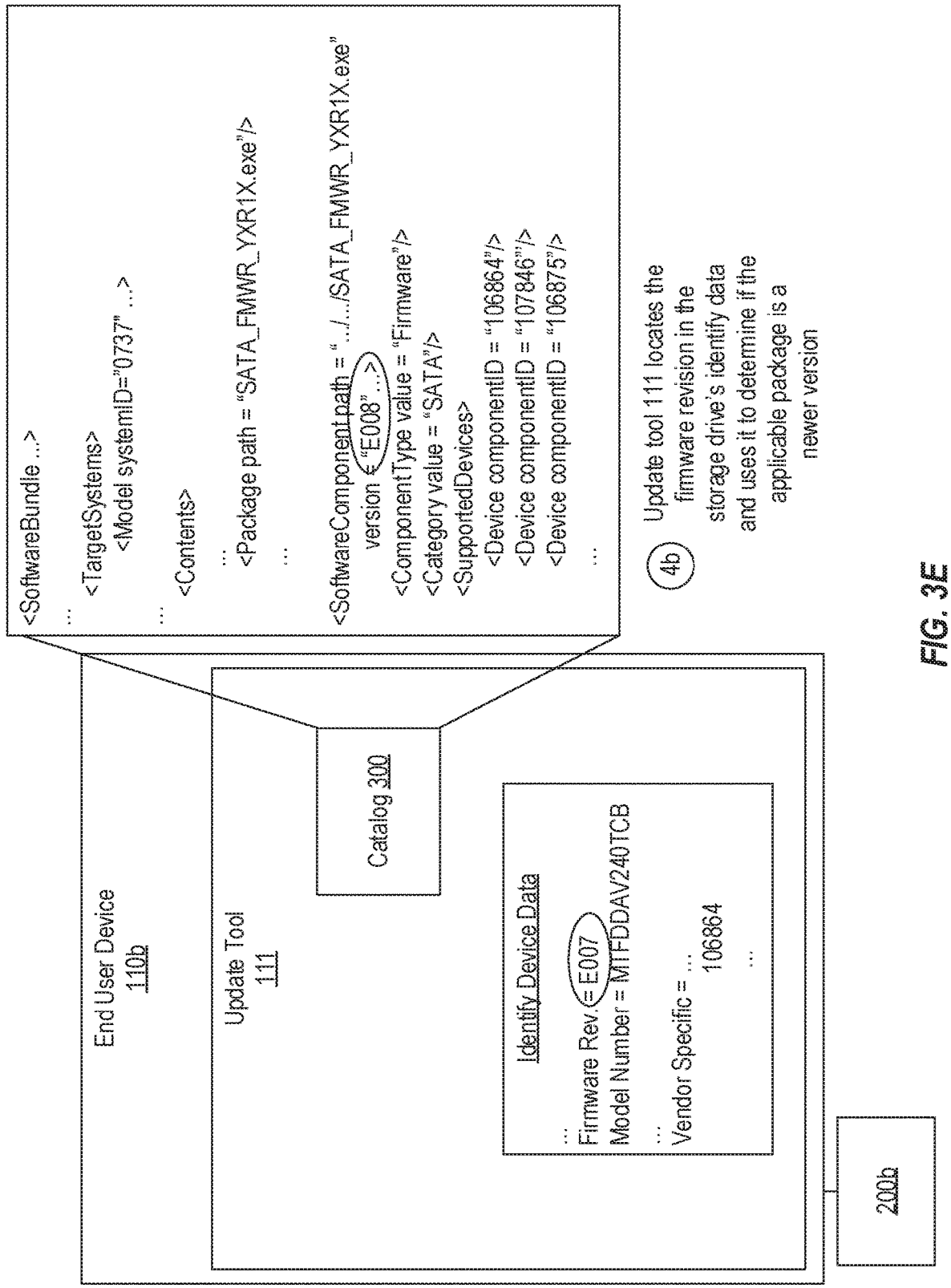

FIGS. 3D and 3E represent how update tool 111 on end user device 110*b* can determine which, if any, package included in catalog 300 applies to storage drive 200*b*. In step 4*a*, update tool 111 can employ the component ID defined in storage drive 200*b*'s identify data to identify a package in catalog 300 that is associated with the same component ID. In this example, update tool 111 will determine that the component ID 106864 is included in the supported devices section for the package named SATA_FMWR_YXR1X.exe. In this way, update tool 111 will be able to dynamically determine that this package targets storage drive 200*b*. Notably, catalog 300 includes multiple other firmware packages for storage drives, but update tool 111 will know that these other packages do not apply to storage drive 200*b* because the component ID 106864 will not be listed in the supported devices section for those packages. As can be seen, the inclusion of the component ID in the identify data of the storage drives enables update tool 111 to perform this determination dynamically.

Once update tool 111 has dynamically identified the package in catalog 300 that applies to storage drive 200*b*, in step 4*b* shown in FIG. 3E, update tool 111 can employ the firmware revision defined in storage drive 200*b*'s identify data to perform a comparison with the firmware revision of the applicable package as defined in catalog 300. In this example, the applicable package has a firmware revision of E008 whereas the firmware revision defined in the storage drive 200*b*'s identify data is E007. Therefore, update tool 111 will determine that the applicable package defined in catalog 300 is an update to the current firmware installed on storage drive 200*b*.

Figure 3F:
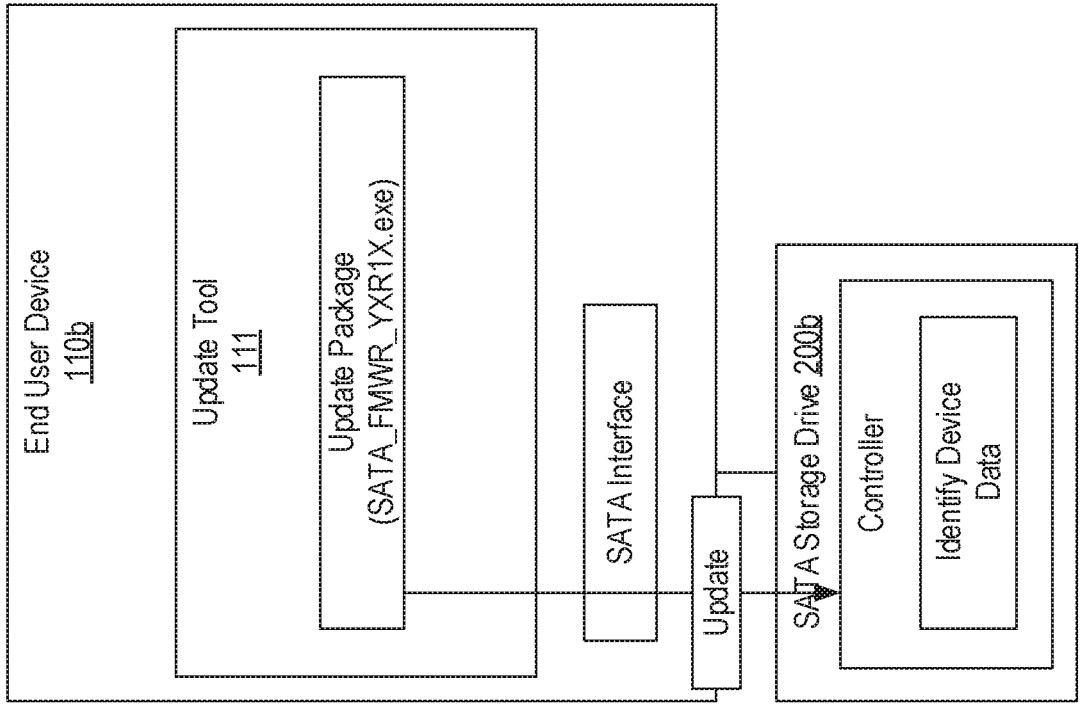
Figure 3G:
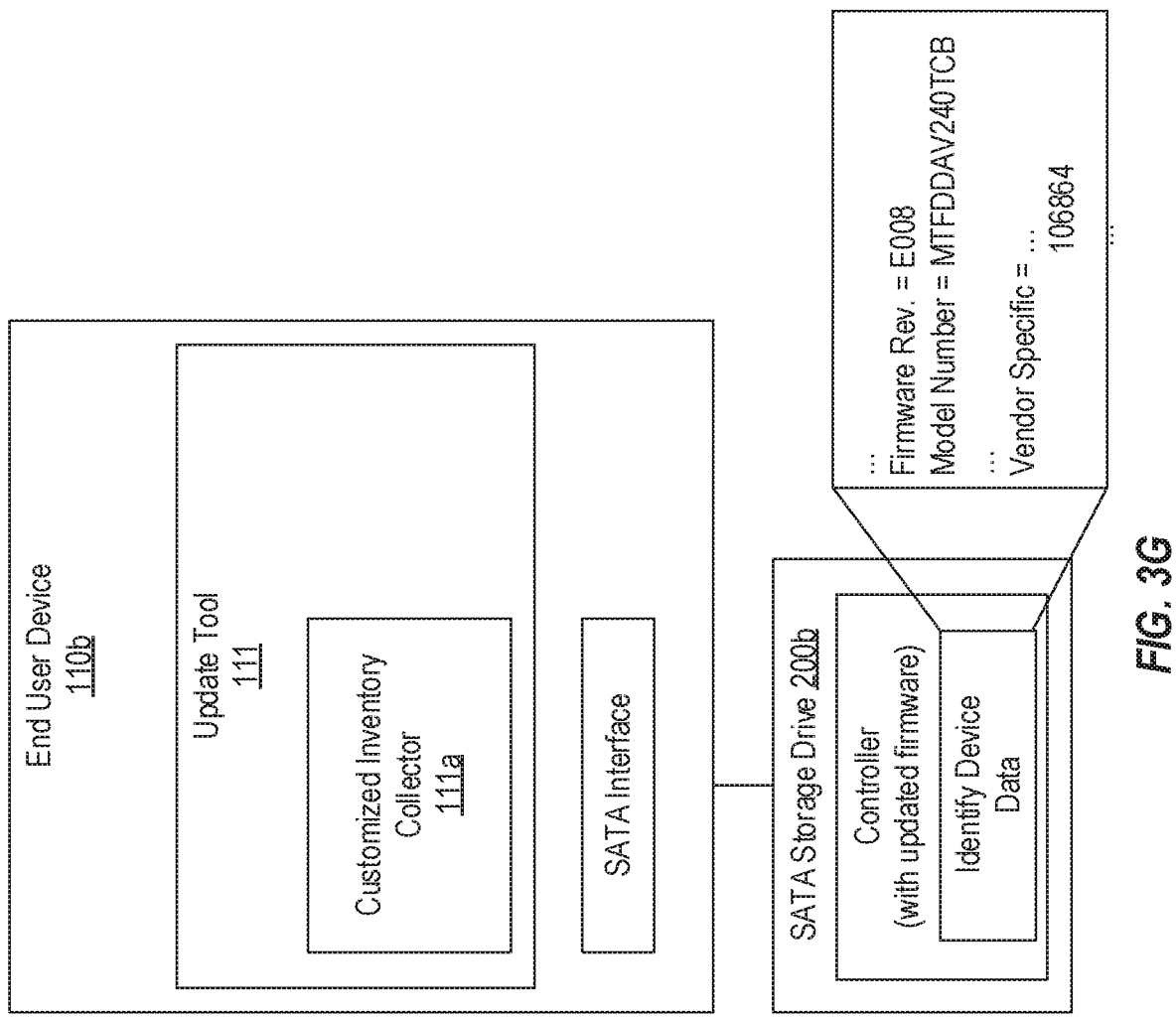

Turning to FIG. 3F, once update tool 111 has identified an applicable package and determined that the package is an update to the existing firmware on storage drive 200*b*, in step 5, update tool 111 can obtain the package itself, if not already retrieved, and execute it to install the firmware on storage drive 200*b*. In this example, update tool 111 can retrieve the executable SATA_FMWR_YXR1X.exe and execute it on end user device 110*b* which in turn will cause the vendor-specific update process to be carried out. FIG. 3G represents that, as a result of this process, the controller on SATA storage drive 200*b* will be updated with the latest firmware (i.e., the firmware provided in the applicable package) including modifying the firmware revision defined in the identify data to reflect this update. Accordingly, at the next update iteration, if the vendor has not released an updated version of the firmware, step 4b would reveal that the applicable package has already been applied to storage drive 200b.

To summarize, embodiments of the present invention enable the vendor-specific firmware update process to be encapsulated into a self-extracting executable that may be published and installed in accordance with a standardized process. In particular, any update to an application, driver, firmware, etc. can be formatted as a self-extracting executable (or package) and identified in a catalog that update tool 111 can process to determine which packages are applicable on any particular end user device. With particular relevance to firmware updates, embodiments of the present invention will eliminate the need for the end user to search for the correct firmware update on a support website—a task that many end users lack the technical knowledge to perform. In fact, in some embodiments, the present invention can be employed to deploy a firmware update to all end user devices having a storage drive with known issues and to automatically install the firmware update to thereby greatly reduce or even eliminate service calls or replacement requests based on such issues.

Figure 4A:
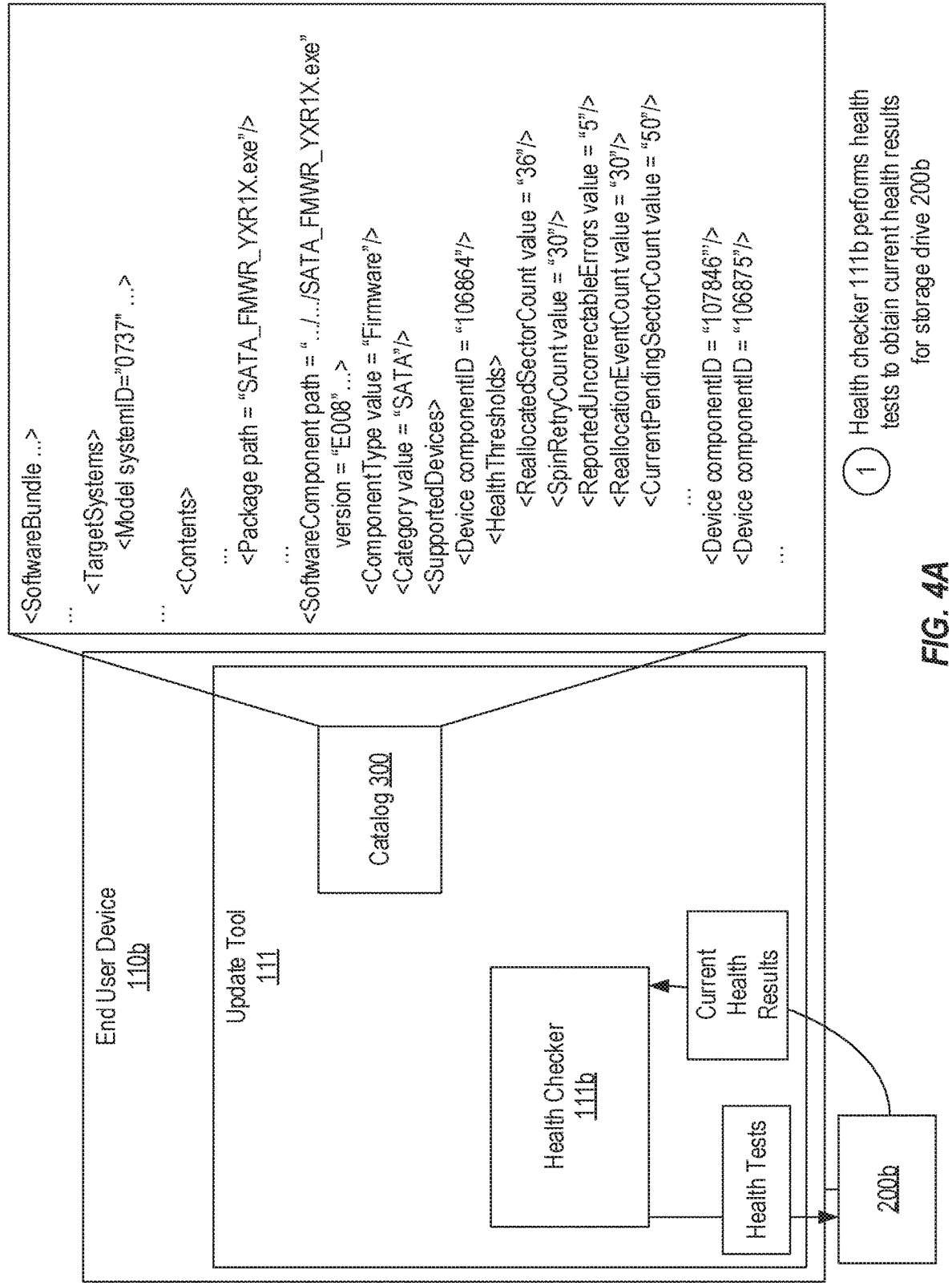
Figure 4B:
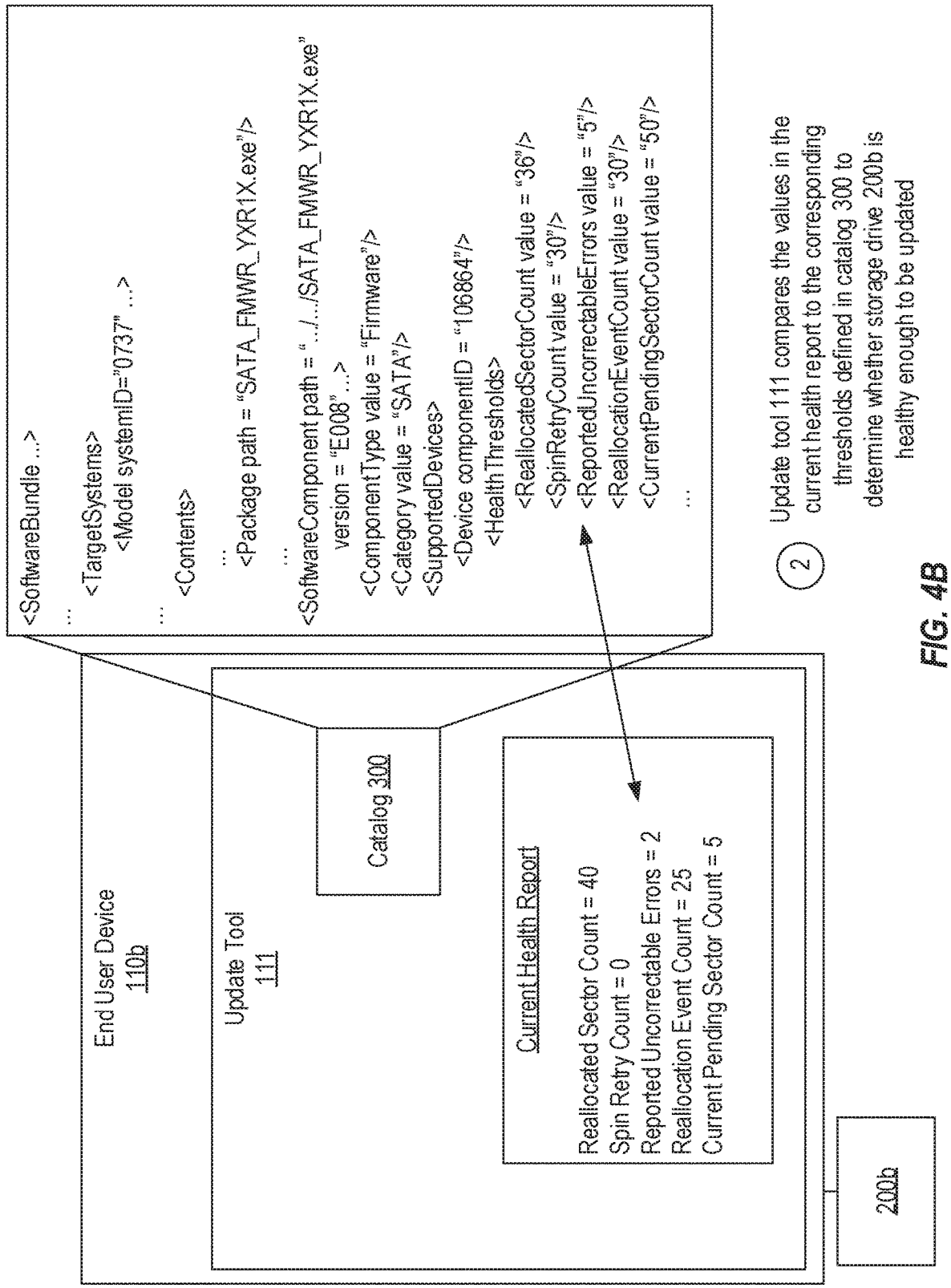
Figure 4C:
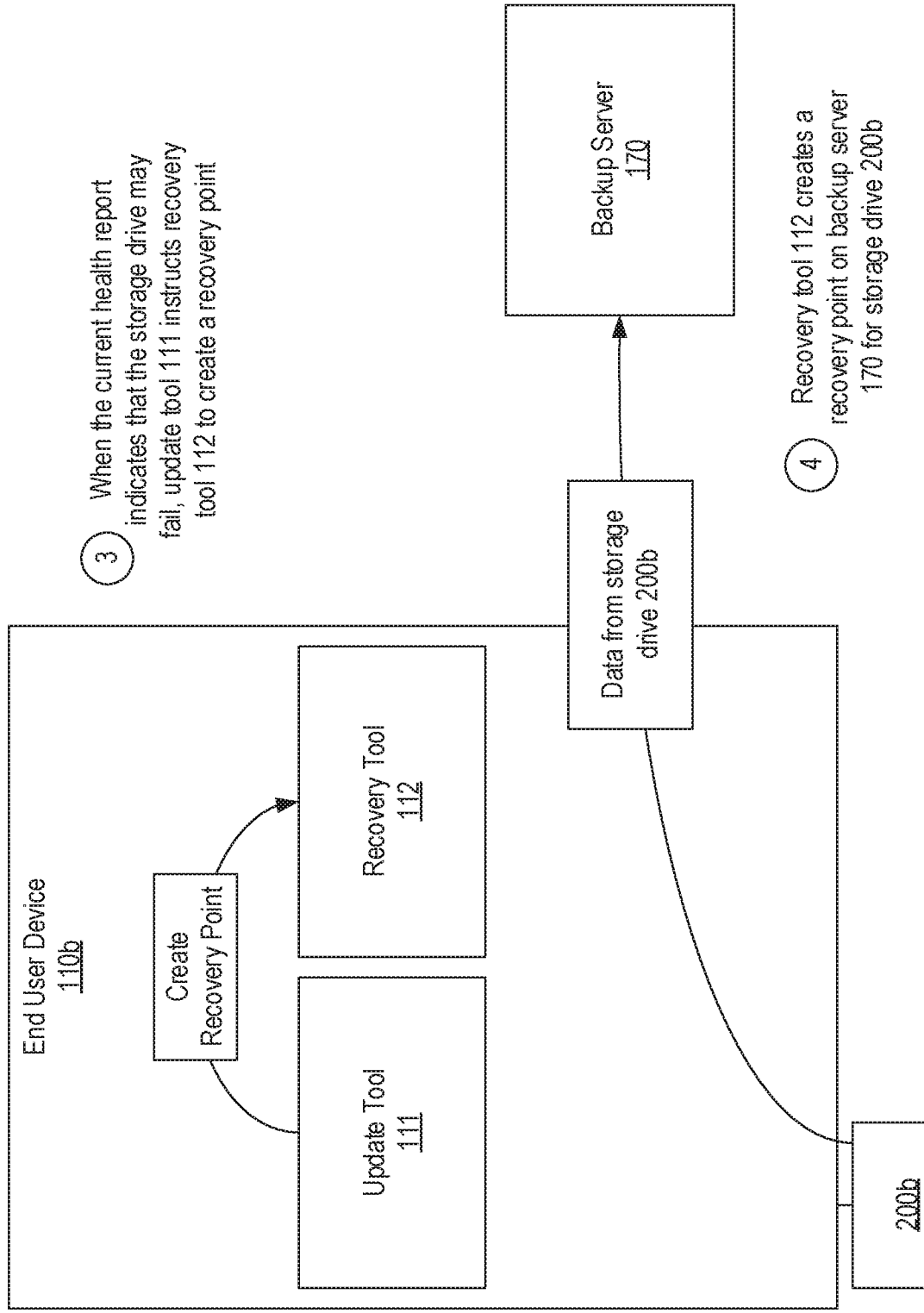

In some embodiments, update tool 111 can also be configured to assess the health of a storage drive prior to installing a firmware update. In such cases, update tool 111 could block the installation of the firmware update if the storage drive's health does not meet a certain level and/or create a backup of the storage drive's content prior to proceeding with the installation. FIGS. 4A-4C provide an example of how update tool 111 may perform this health assessment.

In FIG. 4A, it is assumed that update tool 111 has retrieved catalog 300 in a similar manner as described above. However, in contrast to the previous description, catalog 300 is now assumed to include a "health thresholds" section for each storage drive that is the target of an update defined in catalog 300. For simplicity, in the depicted example, these health thresholds are defined hierarchically under the firmware update section used in the previous example. It is noted, however, that these health thresholds could be defined in any suitable way within or in conjunction with catalog 300 so that update tool 111 can determine which health thresholds apply to a particular storage drive that is about to be updated. In other words, a catalog can define a set of health thresholds for each targeted storage drive. FIG. 4A also shows that update tool 111 can include a health checker 111b which represents the portion of update tool 111 that is configured to perform the functionality described below.

In conjunction with receiving catalog 300 and determining that an update is available for the firmware on storage drive 200b, in step 1, health checker 111b can perform a number of health tests on storage drive 200b to obtain current health results. In some embodiments, these health tests can include obtaining Self-Monitoring, Analysis and Reporting Technology (S.M.A.R.T.) attributes from storage drive 200b. FIG. 4A provides five examples of S.M.A.R.T. attributes that may be employed when assessing the health of a storage drive, but other combinations of S.M.A.R.T. attributes (or equivalent attributes) could be employed.

Turning to FIG. 4B, once the current health report has been obtained for storage drive 200b, in step 2, update tool 111 can compare the current health report to the health thresholds defined in catalog 300 for storage drive 200b. For example, update tool 111 can use the component ID retrieved from storage drive 200b as described above to locate the health thresholds that apply to storage drive 200b. Update tool 111 can then compare the values in the current health report to the corresponding thresholds. If any of the values in the current health report exceed the corresponding threshold, update tool 111 can determine that there is a high probability that storage drive 200b will fail if its firmware is updated.

As shown in FIG. 4C, when update tool 111 determines that storage drive 200b has a high likelihood of failing if its firmware is updated, in step 3, update tool 111 can instruct a recovery tool 112 on end user device 110b to create a recovery point. In response, in step 4, recovery tool 112 will read the data from storage drive 200b and store it as a recovery point on backup server 170. In some embodiments, update tool 111 may first prompt an end user to authorize the creation of the recovery point. Also, in some embodiments, update tool 111 may prompt the end user to authorize proceeding with the update to storage drive 200b's firmware in view of the risk of failure. Similarly, in some embodiments, update tool 111 may forego installing an update to a storage drive's firmware based on the current health report. On the other hand, if the health assessment reveals that there is not a likelihood that storage drive 200b will fail, update tool 111 may automatically proceed to install the firmware update. However, in some embodiments, even if there is no likelihood of failure, update tool 111 may still notify the user and/or create a recovery point.

In any case, assuming update tool 111 determines that the installation of the firmware update should proceed, it can do so as described above. After the installation of the firmware has been completed, whether successfully or not, update tool 111 may report telemetry data for the firmware update to telemetry server 140. For example, this telemetry data can include the component ID of storage drive 200b, an identification of the firmware update, an indication of whether it was successfully installed and the values from the current health report. Telemetry server 140 (or some other server) may evaluate such telemetry data received from the various end user devices that have the same storage drive to determine what, if any, adjustments should be made to the health thresholds. As an example, if many of the same storage drives (i.e., storage drives having the same component ID) failed in response to installing the firmware update, and each of the failed storage drives had a particular S.M.A.R.T. attribute that was elevated but did not exceed the currently defined threshold for that attribute, the defined threshold could be lowered in subsequent catalogs.

To summarize, in conjunction with dynamically identifying a package that constitutes a firmware update to a particular storage drive, update tool 111 may assess the health of the storage drive to determine whether to proceed with the installation of the firmware update. When the assessment reveals that the storage drive's health is not good, update tool 111 may take action prior to installing the firmware update including notifying the end user, creating a recovery point or even foregoing the installation of the firmware update.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A method for updating firmware on a storage drive, the method comprising:
  retrieving, by an update tool that executes on an end user device, a component ID from a vendor-specific section of identify data of a storage drive of the end user device, the vendor-specific section of the identify data being bytes 3126 through 3133 in a Non-Volatile Memory Express (NVMe) identify controller data structure or words 137 through 140 in a Serial Advanced Technology Attachment (SATA), identify device data;
  receiving a catalog that defines a plurality of firmware updates;
  using the component ID to identify a firmware update that applies to the storage drive by determining that the catalog associates the component ID with the firmware update; and
  in response to identifying the firmware update using the component ID, installing the firmware update on the storage drive.

2. The method of claim 1, further comprising:
  retrieving a firmware version from the storage drive; and
  using the firmware version to determine that the firmware update has not been installed on the storage drive.

3. The method of claim 2, wherein retrieving the firmware version from the storage drive comprises reading identify data of the storage drive that is not included in the vendor-specific section.

4. The method of claim 1, further comprising:
  prior to installing the firmware update on the storage drive, performing a health assessment on the storage drive by retrieving one or more current health values from the storage drive and comparing the one or more current health values to corresponding health thresholds.

5. The method of claim 4, wherein the component ID is used to identify the corresponding health thresholds from among other health thresholds.

6. The method of claim 4, further comprising:
  creating a recovery point for the storage drive based on results of the health assessment.

7. The method of claim 4, further comprising:
  after installing the firmware update, reporting telemetry data that links results of installing the firmware update to the one or more current health values.

8. The method of claim 4, wherein the one or more current health values comprises a plurality of Self-Monitoring, Analysis and Reporting Technology (S.M.A.R.T.) attributes.

9. One or more computer storage media storing computer-executable instructions which when executed implement a method for updating firmware on a storage drive, the method comprising:
  receiving, by an update tool that executes on an end user device, a catalog that identifies updates that target the end user device;
  in response to receiving the catalog, retrieving a component ID from a vendor-specific section of identify data of a storage drive of the end user device, the vendor-specific section of the identify data being bytes 3126 through 3133 in a Non-Volatile Memory Express (NVMe) identify controller data structure or words 137 through 140 in a Serial Advanced Technology Attachment (SATA) identify device data;
  using the component ID to locate a firmware update that is identified in the catalog by determining that the catalog associates the component ID with the firmware update; and
  installing the firmware update on the storage drive.

10. The computer storage media of claim 9, wherein the method further comprises:
  prior to installing the firmware update on the storage drive, performing a health assessment on the storage drive by retrieving one or more current health values from the storage drive and comparing the one or more current health values to corresponding health thresholds defined in the catalog.

11. An end user device comprising:
  a storage drive;
  one or more processors; and
  computer readable media storing computer executable instructions which when executed implement an update tool that is configured to update firmware on the storage drive by performing the following:

retrieve a component ID from a vendor-specific section of identify data of the storage drive, the vendor-specific section of the identify data being bytes 3126 through 3133 in a Non-Volatile Memory Express (NVMe) identify controller data structure or words 137 through 140 in a Serial Advanced Technology Attachment (SATA) identify device data;

receive a catalog that defines a plurality of firmware updates;

use the component ID to identify a firmware update that is applicable to the storage drive by determining that the catalog associates the component ID with the firmware update; and retrieve a firmware version from a portion of the identify data of the storage drive that is separate from the vendor-specific section;

use the firmware version to determine that the firmware update has not been installed on the storage drive; and install the firmware update on the storage drive.

12. The end user device of claim 11, wherein the update tool is further configured to perform the following:

prior to installing the firmware update on the storage drive, performing a health assessment on the storage drive by retrieving one or more current health values from the storage drive and comparing the one or more current health values to corresponding health thresholds.

* * * * *